May 9, 1967  R. V. DE LEO ETAL  3,318,146
PRESSURE SENSING INSTRUMENT FOR AIRCRAFT
Filed Feb. 14, 1966  3 Sheets-Sheet 1

INVENTORS
RICHARD V. DE LEO
FLOYD W. HAGEN
BY
Dugger, Braddock, Johnson & Westman
ATTORNEYS

United States Patent Office 3,318,146
Patented May 9, 1967

3,318,146
PRESSURE SENSING INSTRUMENT FOR AIRCRAFT
Richard V. De Leo, Hopkins, and Floyd W. Hagen, Minneapolis, Minn., assignors to Rosemount Engineering Company, Minneapolis, Minn., a corporation of Minnesota
Filed Feb. 14, 1966, Ser. No. 534,274
13 Claims. (Cl. 73—180)

This application is a continuation-in-part of our co-pending application for Pressure Sensing Instrument for Aircraft, Ser. No. 412,977, now abandoned, filed Nov. 23, 1964.

The present invention relates to a sensing instrument which utilizes pressure measurements during aircraft flight to determine the Mach number, flight angles, impact pressure, and static pressure with only one head protruding from the aircraft.

At the present time in making measurement for aircraft, and also in wind tunnels and the like, it is important to measure the Mach number as well as the aircraft flight angles (including the angle of sideslip which occurs in a first plane and the angle of attack which occurs in a second perpendicular plane) in order to properly determine the speed, location, and performance of the aircraft. Further, these measurements are important in maintaining the flight attitude of the aircraft as well as for navigational purposes.

It is also well known that any protrusion from the skin of an aircraft, particularly at supersonic speeds, causes considerable drag and inhibits aircraft performance. Further, in determining the angle of attack and the angle of sideslip, previous instruments have used moving parts which align with the air flow. Some of the inherent disadvantages to instruments of this type stem from the problems of deicing and the requirement that separate instruments be utilized for making each measurement. Besides being costly, these instruments cause considerable drag on the aircraft.

The device of the present invention, as shown, comprises a single tube that can be made relatively short as compared to conventional Pitot-type measuring instruments and is easy to deice with electrical heaters. There are no moving parts and the single sensor protruding into the air stream has a plurality of ports thereon which permit simultaneous measurements of the angle of attack, the angle of sideslip, the Mach number, as well as both the impact pressure and static pressure of the air stream. This use of a single instrument greatly reduces the drag on the aircraft and supplies all the measurements normally required by the aircraft for proper flight, except the total temperature of the air. The total temperature measurement is primarily used to compute true air speed and free air temperature and in the case of some aircraft is relatively unimportant, and frequently it is not obtained at all.

The output from the sensor of the present invention can be fed into suitable transducers which generates electrical signals proportional to the pressure signals (several capacitance-type pressure transducers for example are suitable). In turn, the individual electrical signals from each of the measured pressures can be fed into an airborne computer and the computer in turn relates the required information as to the angle of attack, angle of sideslip, as well as the Mach number.

Of course, in the normal scheme of things, the computer can also be programmed to compensate for errors due to variations in outside conditions. Further, the output of the computer can be used for operating autopilots or other aircraft components which are commonly employed to maintain the aircraft on a predetermined course. All the necessary measurements can be derived by unique methods without a directly measured static pressure.

It is therefore an object of this invention to provide a single sensor which does not rely upon moving parts, and which will sense pressure measurements that can be used for determining the Mach number, the angle of attack, the angle of sideslip, and other important data utilizable in high performance aircraft flight.

It is another object of the invention to present unique methods of utilizing pressure measurements from a probe to obtain all necessary air data without using a directly measured static pressure.

It is a further object of the present invention to present an apparatus for obtaining angle of attack and angle of sideslip that gives linear responses over a wide range of Mach numbers.

Other objects of this invention will become apparent as the description proceeds.

Figure 2:
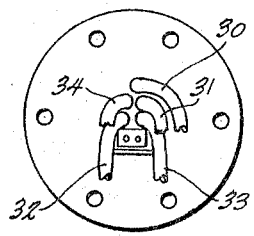
FIG. 2 is a fragmentary end view taken as on line 2—2 of FIG. 1.
Figure 1:
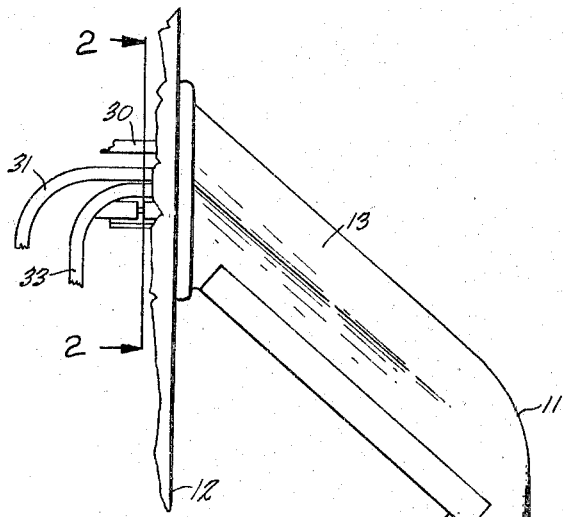
FIG. 1 is a plan view of a sensor made according to the present invention and designed for mounting onto the fuselage of an aircraft.
Figure 4:
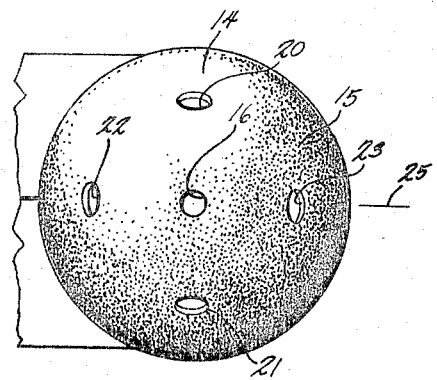
FIG. 4 is a fragmentary enlarged end view of the sensor taken as on line 4—4 of FIG. 1.
Figure 3:
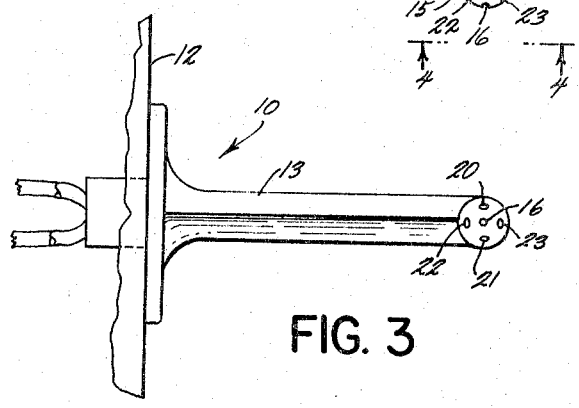
FIG. 3 is a front elevational view of the device of FIG. 1.
Figure 5:
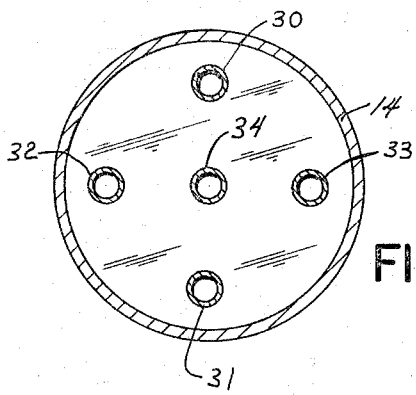
FIG. 5 is an enlarged sectional view taken as on line 5—5 of FIG. 1.

Referring to the drawings and the numerals of reference thereon, a sensor illustrated generally at 10 includes a probe 11 which is attached to an aircraft 12 and protrudes out into the air stream. The probe 11 has a suitable first support section 13 and a cylindrical sensor section 14 which is aligned with the axis of the aircraft in a predetermined relation.

The outer end portion 15 of the sensor section 14 is hemispherically shaped and has five ports thereon. As shown, it has an axial port 16 in the center leading edge position; and it has four other ports which are equally spaced in surrounding position with respect to axial port 16. Included are a first port 20 and a second port 21, both of which have their axes lying in a common plane which passes through the longitudinal axis of the sensor section 14 and is vertical during straight and level flight. In addition, the axes of ports 20 and 21 are preferably inclined at substantially 45° from the axis of the sensor section 14. The location of the ports 20 and 21 has been found to be suitable between 35° and 55° with respect to the longitudinal axis of the sensor 14.

In addition, a third port 22 and a fourth port 23 are provided on the hemispherical end portion 15 and have their axes lie on a plane passing through the longitudinal axis of sensor 14 and perpendicular to the plane of the axes of ports 20 and 21. In other words, during straight and level flight, the axes of ports 22 and 23 would lie in the horizontal plane indicated at 25. The axes of ports 22 and 23 are also inclined at 45° from the longitudinal axis of the sensor 14 and these ports could likewise be positioned anywhere between 35° and 55° with respect to the latter.

As shown, each of the ports are connected to a separate conduit. For example, port 20 is connected to a conduit 30, port 21 is connected to a conduit 31, port 22 is connected to a conduit 32, port 23 is connected to a conduit 33, and port 16 is connected to a conduit 34. These conduits open to their respective ports and extend through the sensor section 14 and the support section 13. The conduits can be supported on bulkheads or in any other suitable manner.

Assuming straight and level flight, it can be seen that the pressure at port 16 will be the total pressure, equal to the normal Pitot or stagnation pressure of an aircraft. The pressures at the ports 20, 21, 22 and 23 will all be equal and slightly less than the pressure at port 16 since they are situated downstream from the stagnation point. Now, if the angle of attack changes, a pressure differential occurs between ports 20 and 21, and the magnitude of this differential depends upon the amount of change in the angle of attack. Whether the differential is positive or negative would, of course, depend upon whether the change in the angle of attack is positive or negative. Likewise, if there is any sideslip, a pressure differential occurs between ports 22 and 23, and the measure of this differential is used in determining the angle of sideslip.

With this sensor we have five pressure measurements. The pressure at port 16, of $P_T$; and the pressures at ports 20, 21, 22 and 23. From these measurements the angle of attack, the angle of sideslip, the total pressure, the Mach number and the static pressure can be derived.

Figure 6:
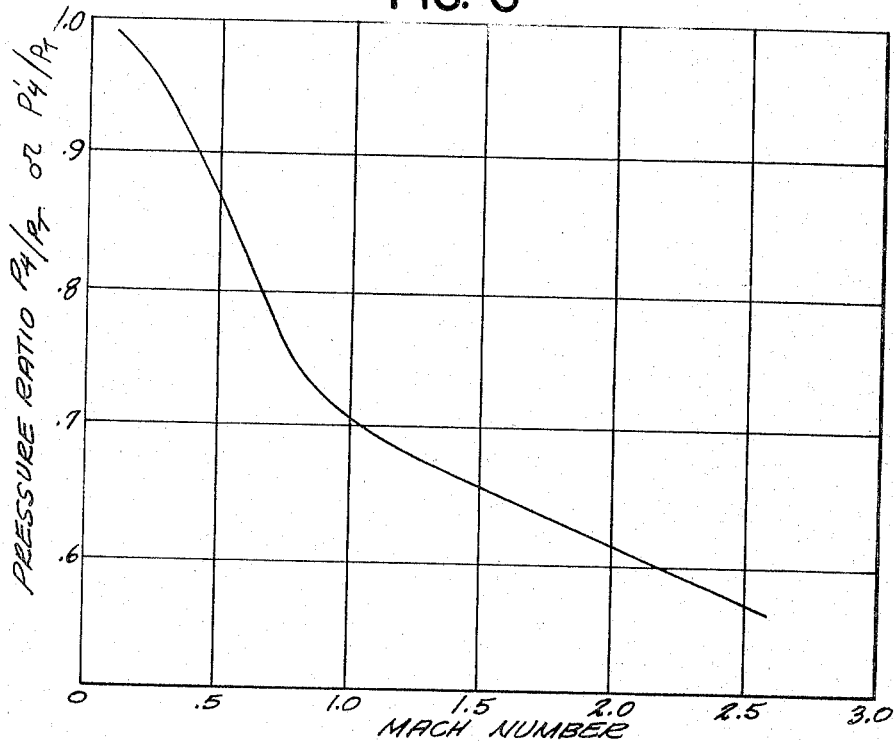
FIG. 6 is a graphical representation showing the relationship of certain pressure ratios and Mach numbers.

It has been found through analysis and experimentation that the Mach number of the airplane (Mach number is the ratio of the speed of the aircraft to the speed of sound in the fluid medium) is a function of the average pressure between the ports 22 and 23 ($P_4$) divided by the stagnation pressure at port 16 ($P_T$). It has also been found experimentally that this holds true across a wide range of Mach values. The derived curves shown in FIG. 6 represent substantially straight line functions, but vary in slope between three ranges of Mach values, namely, from .2 to about .8, from .8 to 1.1, and from 1.1 and over. Therefore, knowing the pressure ratio of $P_4/P_T$, means is provided for determining the Mach number of the aircraft.

Figure 7:
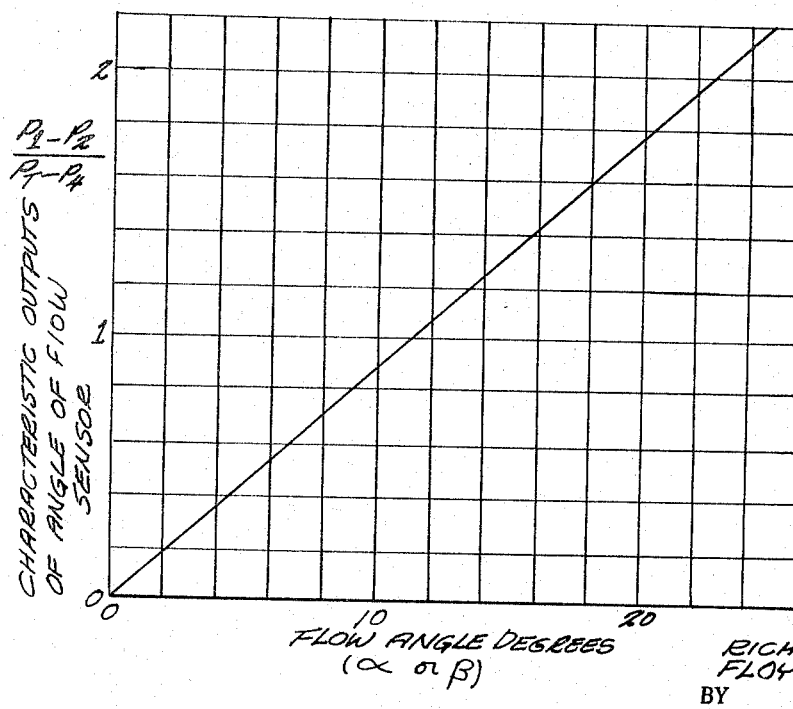
FIG. 7 is a graphical representation showing the relationship of certain pressure ratios and various flight angles.

In addition, it has been found experimentally that the difference in pressure between ports 20 and 21 ($P_1-P_2$) divided by the difference in pressure between port 16 ($P_T$) and the average pressure at ports 22 and 23 ($P_T-P_4$) is a substantially linear function of the flow angle. This relationship is shown in FIG. 7. Likewise, if the angle of sideslip is desired it can be determined by the ratio of the pressure differential between ports 22 and 23 ($P_1$ and $P_2$) divided by the difference in pressure between port 16 ($P_T$) and the average pressure at ports 20 and 21 ($P_4'$). Accordingly, means is provided for determining both the angle of attack and the angle of sideslip.

It has been found that the factor $P_4$ in formula, which as above was indicated as the average of pressure located at ports with axes in a plane at right angles to the plane in which the measurement is taking place, can be replaced by the sum of $P_1$ and $P_2$ divided by an averaging or normalizing factor. At normal angles of attack (under 12°) the factor can be 2. In other words, the average pressure at the ports located in the plane of measurement will be the $P_4$ figure. At higher angles of attack, instead of a true average figure, the sum of $P_1$ and $P_2$ will be divided by a factor of approximately 1.6. This factor gives linearity up to angles of attack of 20°. Thus $P_4$ is defined as a normalized pressure between two ports on the probe.

This can be expressed as follows:

$$\frac{P_1-P_2}{P_T - \frac{(P_1+P_2)}{K}}$$

For averaging K equals 2. For high angles or where a particular non-linearity may be preferred, K may typically range between 1.4–1.6 and can be determined by wind tunnel tests. The factor $$\frac{P_1+P_2}{K}$$

is the $P_4$ figure. Such a particular non-linearity may be desirable in a particular aircraft to obtain correspondence between aerodynamic effects on the wings and on the probe. For years designers have attempted to compensate for all aerodynamic effects with computers. With the present system many of these effects are compensated right at the probe. Examples of other formulas which utilize the principles of this invention and give results corresponding to the above formula are:

$$\frac{P_1-P_2}{(P_T-P_1)+\frac{(P_1-P_2)}{K}} \quad \text{or} \quad \frac{(P_1-P_2)(K)}{K(P_T-P_1)+(P_1-P_2)}$$

The last two formulas make it possible to obtain all measurements using only differential pressure sensors. The K factor is added in the computer.

This discovery also suggests that the normalizing pressure factor $P_4$ can be obtained by using the pressure signals from ports on a curved surface of probe wherein the plane defined by the axes of the ports lies anywhere between 0° and 90° from the plane of measurement. As shown, the normalizing function can come from the same two ports used for angle measurement. These pressures, together with total pressure measurement, are all the measurements that are needed. Therefore, there may only be three ports in the curved surface, or perhaps two ports on the curved surface and a separate total pressure port.

It has further been found that the static pressure (P) is a function of the Mach number (M) and the total pressure. The static pressure (P) is equal to the total pressure ($P_T'$) minus the impact pressure ($q_c$). For small angles of attack and sideslip, the total pressure ($P_T'$) is accurately sensed by port 16. The error due to this assumption is considered to be negligibly small provided that the squareroot of ($\alpha^2+\beta^2$) is less than 5°. For values above 5°, the error becomes significant, but this error can be compensated by suitable calibration equipment used with the probe. This calibration can be derived on the basis of wind tunnel or flight data. The error of reading from the port 16 is a function of the angle of attack ($\alpha$) and the angle of sideslip ($\beta$) and these are measured properties with the probe of the present invention.

The formulas which give the static pressure (P) when Mach and total pressure ($P_T'$) are known are as follows:

(1) For subsonic speeds $\frac{P_T'}{P} = (1+.2M^2)^{3.5}$ (2) For supersonic speeds $\frac{P_T'}{P} = (1.2M^2)^{3.5}\left[\frac{6}{7M^2-1}\right]^{2.5}$ These Formulas 1 and 2 are calculated in a computer because all of the necessary information to determine the total pressure and Mach number has been supplied, as previously explained.

Figure 8:
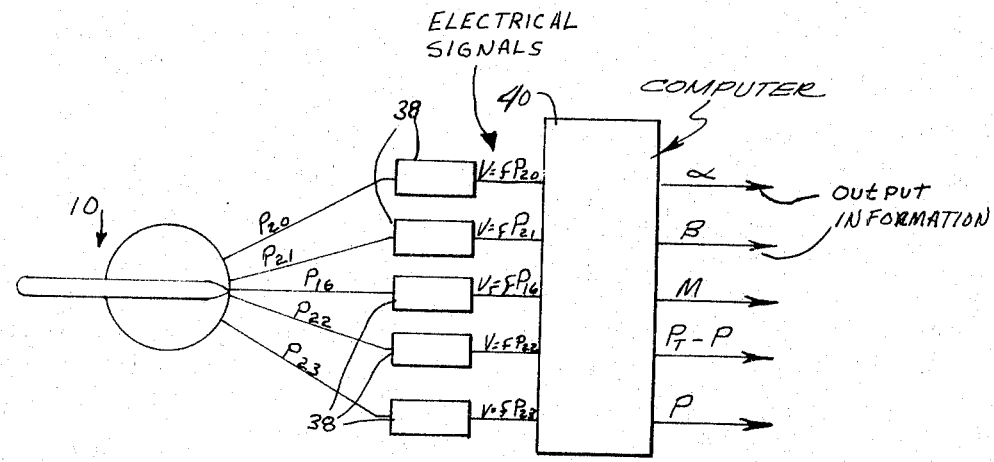
FIG. 8 is a schematic representation of the sensor together with its various transducers and computers.

As shown schematically in FIG. 8, the pressure sensed by the probe of the present invention is introduced from suitable conduits to a transducer 38 which changes each of these pressures into a separate electrical signal. Suitable transducers can be utilized such as the model 800 series made by the Rosemount Engineering Company. For convenience, the pressures being sent to the transducer are labeled with the port number. For example, $P_{20}$ is the pressure from port 20 going to the transducer. The transducer will then convert these pressures into voltages which will be functions of the pressures.

These signals can be fed into a computer 40. The computer is programmed so that the voltages are added, subtracted and divided according to the proper programming in accordance with the formulas, graphs and ratios previously discussed.

The computer can also compensate for external changes that may be fed into it.

The particular transducers used is a matter of selection within the transducers presently available on the market and the programming of the computer is also a standard operation well within the skill of the ordinary programmer.

While the end surface of the probe has been described as being hemispherical, it can also be parabolic, conical or ogival in shape as long as it slopes outwardly downstream and is symmetrical about a plane at right angles to the plane in which the angle to be measured is located. The ports will be subjected to equal flow conditions when the probe is parallel to the flow and will remain under equal pressure unless the longitudinal axis of the probe changes with respect to the flow axis.

In addition, the probe 11 can be electrically heated by suitable resistance heaters to deice the unit. These heaters are well known in the art and are shown in several patents, for example, Patent No. 2,510,986. Suitable electrical connections can be provided for these heaters if desired.

The probe of the present invention is shown mounted on a fuselage. However, it could also be mounted on the nose boom or in some other location. If mounted on the nose boom, only a section corresponding to section 14 of the probe is needed. The probe of this invention can be much shorter than previous Pitot tubes because the static pressure is calculated from the measured pressures and not measured directly. When measured directly, the probe with the static pressure port had to be sufficiently long to space the static pressure port away from the aircraft a sufficient distance to make sure true static pressure was being measured.

The short probe, particularly when nose mounted instruments are needed, sharply reduces the likelihood of damage to the instrument and also greatly reduces storage space requirements for aircraft.

It should be noted that in certain instances the probe will be used with the ports 20, 21, 22 and 23 active and without a Pitot pressure port. The Pitot pressure would be sensed by another conventional probe or could be sensed by a separate section or extension of the same probe. The section 14 in some cases forms an extension from the standard Pitot tubes.

In cases where both angle of attack and angle of sideslips are measured, the four ports (two pairs) are used and the axes of each pair of ports define a plane perpendicular to a plane defined by the axes of the other pair of ports. The line of intersection between these planes will be the effective probe axis and is positioned parallel to the normal fluid flow axis when the probe or aircraft is properly positioned and any deviation of the probe axis from this orientation is sensed as described. By knowing the angular relationship between the probe axis and the aircraft axis the position of the aircraft in relation to normal flight position can be sensed and measured. The probe axis does not necessarily coincide with the longitudinal axis of section 14, but in the usual case will, as shown. If the port 16 is provided, the axis of this port will be on the effective probe axis.

Any offset of the effective probe axis from the longitudinal axis of the probe tube will be to compensate for droop of the nose boom, for example or other factors.

What we claim is:

1. A sensing instrument for sensing the angular position of an axis of an object moving relative to a fluid medium with respect to a first plane, said object having a leading end exposed to the fluid medium, a first pair of pressure sensing ports on the object and facing in upstream direction, said first pair of ports having their axes lying in a second plane at right angles to said first plane and disposed at predetermined angles with respect to the axis of said object, a second pair of pressure sensing ports having their axes lying in said first plane, the axes of said second pair of ports being disposed at predetermined angles with respect to the axis of said object, a single pressure port having an axis coinciding with the axis of the object, and means to receive pressure signals from said ports and provide a separate signal according to the formula $$\frac{P_1 - P_2}{P_T - P_4}$$

where $P_1$ and $P_2$ are pressures at each of the first pair of ports respectively, $P_4$ is the average pressure at the second pair of ports and $P_T$ is the pressure at said single port.

2. Instrument means for obtaining a flow angle of an object in an airstream with respect to a predetermined plane without having a separate static pressure measurement, said object having a leading edge portion projecting into the fluid medium and facing upstream, said leading end portion having a fixed upstream facing surface, a single pressure port thereon having an axis substantially coinciding with the axis of said object, a first pair of pressure sensing ports defined in said upstream facing surface, said first pair of ports having their axes lying in a first plane and disposed at predetermined angles with respect to said axis of said object, transducer means for obtaining signals from the said first pair of pressure ports corresponding to $P_1$ and $P_2$, a second pair of pressure sensing ports on the upstream facing surface having their axes lying in a second plane disposed at substantially right angles to said first plane and at predetermined angles with respect to the axis of said object, transducer means for providing a signal $P_4$ corresponding to the average pressure at said second pair of ports, transducer means for providing a signal $P_T$ corresponding to the pressure at said single pressure port, and computer means for giving a signal proportional to the formula $$\frac{P_1 - P_2}{P_T - P_4}$$

3. The combination as specified in claim 2 wherein the respective axes of the first and second pairs of ports are at equal and opposite angles with respect to the axis of the object.

4. A method of measuring the flow angle of an object in a fluid with respect to a predetermined plane comprising the steps of:

obtaining pressure signals $P_1$ and $P_2$ at first and second spaced, upstream facing ports, respectively on the object, said first and second ports having axes lying in a first plane, the axes of said ports each being at an acute angle with respect to the flow direction of the object;

obtaining the average pressure signal $P_4$ at third and fourth spaced upstream facing ports, having axes lying in a second plane substantially perpendicular to the first plane, the axes of the third and fourth ports each being at an acute angle with respect to the flow direction of the object;

obtaining the pressure signal $P_T$ at an upstream facing port having an axis substantially parallel to the axis of the object; and providing means to receive the pressure signals and deliver a signal proportional to the formula $$\frac{P_1 - P_2}{P_T - P_4}$$

5. A sensing apparatus for sensing the angular position with respect to a reference plane of an axis of an object moving relative to a fluid medium, said object having a curved leading end surface exposed to the fluid medium, a plurality of spaced apart ports in said curved leading end surface and facing at least partially in the direction of said axis, first means to obtain a signal proportional to a normalized pressure between two of said ports, second means to obtain signals proportional to the pressures at two ports having axes defining a first plane at right angles to the reference plane, a single pressure port having an axis substantially parallel to the axis of the object, third means to obtain a signal proportional to the pressure at said single port, and means to combine the signals and give an output corresponding to the formula $$\frac{P_1-P_2}{P_T-P_4}$$

wherein $P_1$ and $P_2$ are pressure signals at the ports lying in said first plane, $P_4$ is the normalized pressure signal and $P_T$ is the pressure signal at said single port.

6. The combination as specified in claim 5 wherein the first means is comprised as transducer means which utilize pressure signals from the same ports as said second means.

7. A sensing instrument for sensing the angular position with respect to a reference plane of an axis of an object moving relative to a fluid medium, said object having a leading end exposed to the fluid medium, a plurality of pressure sensing ports on the object and facing in upstream direction, at least two ports having their axes lying in a first plane which is at right angles to the reference plane, said ports being disposed at predetermined angles with respect to the axis of said object, a single pressure port having an axis parallel with the axis of the object, and means to receive pressure signals from said ports and provide a separate signal corresponding to the formula $$\frac{P_1-P_2}{P_T-P_4}$$

where $P_1$ and $P_2$ are pressures at each of the pair of ports having axes in said first plane, $P_4$ is an average pressure at two ports in the leading end of the object and $P_T$ is the pressure at said single port.

8. A method of measuring the flow angle of an object in a fluid with respect to a predetermined plane comprising the steps of:
obtaining pressure signals $P_1$ and $P_2$ at a pair of spaced, upstream facing ports, respectively on the object, said ports having axes lying in a first plane at right angles to the predetermined plane, the axes of said ports each being at an acute angle with respect to the flow direction of the object;
obtaining a normalized pressure signal $P_4$ at a pair of spaced upstream facing ports, the axes of the last mentioned ports each being at an acute angle with respect to the flow direction of the object;
obtaining the pressure signal $P_T$ at an upstream facing port having an axis substantially parallel to the axis of the object; and
providing means to receive the pressure signals and deliver a signal substantially corresponding to the formula $$\frac{P_1-P_2}{P_T-P_4}$$

or its equivalents.

9. The method of claim 8 wherein the normalized pressure signal $P_4$ is obtained by the formula $$\frac{P_1+P_2}{K}$$

wherein K is a normalizing factor.

10. Means for measuring the flow angle of an object in a fluid medium with respect to a predetermined plane, said object having an upstream end portion with an axis normally substantially parallel to the axis of the object and which increases in transverse dimension in downstream direction, a single port defined in an upstream surface of the object, and having an axis parallel to the axis of the object, the pressure at the single port giving a pressure signal $P_T$, a first pair of pressure sensing ports on the leading end portion, said first pair of ports having their axes lying in a common plane and disposed at equal acute angles with respect to the axis of the upstream end portion, pressures at the first pair of ports giving pressure signals $P_1$ and $P_2$, respectively, a second pair of pressure sensing ports on the upstream end portion, said second pair of pressure sensing ports having their axes lying in a common plane substantially perpendicular to the plane defined by the axes of the first pair of ports, means for averaging the pressure at the second pair of ports to give a pressure signal $P_4$, and means to give a signal corresponding to the formula $$\frac{P_1-P_2}{P_T-P_4}$$

thereby giving a signal proportional to the flow angle of the fluid with respect to the object as measured in the plane of the axes of the first pair of ports.

11. A sensing apparatus for sensing the Mach number (M) of an object having an axis and moving relative to a fluid medium, said object having a curved leading end surface exposed to the fluid medium, at least two spaced apart ports in said curved leading end surface and facing at least partially in the direction of said axis, first means to obtain a signal proportional to a normalized pressure between said two ports, a single port having an axis substantially parallel to the axis of the object, and means to give a signal proportional to $P_4/P_T$ wherein $P_4$ is the normalized pressure at the two ports and $P_T$ is the pressure at said single port.

12. The combination as specified in claim 11 and computer means responsive to signals which are functions of $P_T'$ and Mach number to deliver a signal corresponding to the formulas:

(1) For subsonic speeds $\frac{P_T'}{P}=(1+.2M^2)^{3.5}$ (2) For supersonic speeds $\frac{P_T'}{P}=(1.2M^2)^{3.5}\left[\frac{6}{7M^2-1}\right]^{2.5}$ where M is Mach number and $P_T'$ is the total pressure, thereby giving a signal proportional to static pressure (P).

13. The sensing apparatus of claim 11 wherein the normalized pressure is the average of the pressures at the two spaced apart ports.

References Cited by the Examiner
UNITED STATES PATENTS

| | | | |
|---|---|---|---|
| 2,237,306 | 4/1941 | Hood | 73—180 |
| 2,660,056 | 11/1953 | Schuck et al. | 73—180 |
| 2,923,152 | 2/1960 | Mabry et al. | 73—180 X |
| 2,985,012 | 5/1961 | Wail | 73—178 X |
| 3,094,868 | 6/1963 | Anderson et al. | 73—180 X |

LOUIS R. PRINCE, *Primary Examiner.*

N. B. SIEGEL, *Assistant Examiner.*